(12) United States Patent
Platt et al.

(10) Patent No.: US 8,738,354 B2
(45) Date of Patent: May 27, 2014

(54) TRANS-LINGUAL REPRESENTATION OF TEXT DOCUMENTS

(75) Inventors: John Platt, Bellevue, WA (US); Ilya Sutskever, Toronto (CA)

(73) Assignee: Microsoft Corporation, Redmond, WA (US)

( * ) Notice: Subject to any disclaimer, the term of this patent is extended or adjusted under 35 U.S.C. 154(b) by 1001 days.

(21) Appl. No.: 12/488,422

(22) Filed: Jun. 19, 2009

(65) Prior Publication Data
US 2010/0324883 A1 Dec. 23, 2010

(51) Int. Cl.
*G06F 17/28* (2006.01)
*G06F 17/20* (2006.01)

(52) U.S. Cl.
USPC .................................. 704/2; 704/7; 704/8

(58) Field of Classification Search
USPC ..................................... 704/2, 8, 9
See application file for complete search history.

(56) References Cited

U.S. PATENT DOCUMENTS

| | | | |
|---|---|---|---|
| 4,843,562 A | 6/1989 | Kenyon et al. | |
| 5,210,820 A | 5/1993 | Kenyon | |
| 6,061,680 A | 5/2000 | Scherf et al. | |
| 6,154,773 A | 11/2000 | Roberts et al. | |
| 6,192,360 B1 * | 2/2001 | Dumais et al. | 1/1 |
| 6,219,646 B1 | 4/2001 | Cherny | |
| 6,230,207 B1 | 5/2001 | Roberts et al. | |
| 6,349,276 B1 | 2/2002 | McCarley | |
| 6,757,646 B2 * | 6/2004 | Marchisio | 704/8 |
| 7,082,394 B2 | 7/2006 | Burges et al. | |
| 7,124,073 B2 * | 10/2006 | Tokuda et al. | 704/2 |
| 7,251,637 B1 | 7/2007 | Caid et al. | |
| 7,269,598 B2 * | 9/2007 | Marchisio | 1/1 |
| 7,487,151 B2 * | 2/2009 | Yamamoto | 1/1 |
| 7,509,578 B2 | 3/2009 | Rujan et al. | |
| 8,290,961 B2 * | 10/2012 | Chew et al. | 707/748 |
| 2002/0103799 A1 * | 8/2002 | Bradford et al. | 707/6 |
| 2003/0028796 A1 | 2/2003 | Roberts et al. | |
| 2003/0086341 A1 | 5/2003 | Wells et al. | |
| 2003/0095660 A1 | 5/2003 | Lee et al. | |
| 2003/0154068 A1 * | 8/2003 | Tokuda et al. | 704/7 |
| 2003/0154071 A1 | 8/2003 | Shreve | |
| 2003/0236661 A1 | 12/2003 | Burges et al. | |
| 2004/0128288 A1 * | 7/2004 | Cancedda | 707/4 |
| 2004/0260727 A1 | 12/2004 | Goldstein et al. | |
| 2005/0086214 A1 | 4/2005 | Seewald et al. | |

(Continued)

FOREIGN PATENT DOCUMENTS

EP 0480010 4/1992

OTHER PUBLICATIONS

Lim et al, "Using Latent Semantics for NE Translation", in Lecture Notes in Artificial Intelligence, 2006,ICCPOL 2006, LNAI 4285, Springer-Verlag Berlin Heidelberg 2006, pp. 457-465.*

(Continued)

*Primary Examiner* — Richemond Dorvil
*Assistant Examiner* — Olujimi Adesanya
(74) *Attorney, Agent, or Firm* — Steve Wight; Carole Boelitz; Micky Minhas (57) ABSTRACT

A method of creating translingual text representations takes in documents in a first language and in a second language and creates a matrix using the words in the documents to represent which words are present in which language. An algorithm is applied to each matrix such that like documents are placed close to each other and unlike documents are moved far from each other.

21 Claims, 7 Drawing Sheets

(56) References Cited

U.S. PATENT DOCUMENTS

| | | | |
|---|---|---|---|
| 2006/0009963 A1* | 1/2006 | Gaussier et al. | 704/7 |
| 2006/0106867 A1* | 5/2006 | Burges et al. | 707/104.1 |
| 2006/0265209 A1* | 11/2006 | Bradford | 704/9 |
| 2007/0230791 A1* | 10/2007 | Chellapilla et al. | 382/188 |
| 2008/0189257 A1 | 8/2008 | Wiseman et al. | |
| 2008/0306727 A1 | 12/2008 | Thurmair et al. | |

OTHER PUBLICATIONS

Chopra, S.; Hadsell, R.; LeCun, Y.; , "Learning a similarity metric discriminatively, with application to face verification," Computer Vision and Pattern Recognition, Jun. 2005. CVPR 2005. IEEE Computer Society Conference on , vol. 1, no., pp. 539-546 vol. 1.*

Vinokourov et al, "Inferring a semantic representation of text via cross-language correlation analysis", 2002, In Advances in Neural Information Processing Systems (NIPS) 15, pp. 1-8.*

Bromley et al, "Signature verification using a siamese time delay neural Network", 1993, Advances in Neural Information Processing Systems, pp. 737-744.*

Bermejo et al "Oriented principal component analysis for large margin classifiers", 2001, In Neural Networks. vol. 14, 10, 1447-1461 (2001).*

Gaussier et al, "A geometric view on bilingual lexicon extraction from comparable corpora", In ACL 2004, pp. 527-534.*

Potthast et al, "A Wikipedia-based Multilingual Retrieval Model",In: 30th European conference on information retrieval Glasgow, Scotland, 2008, pp. 522-530.*

Gliozzo et al, "Exploiting comparable corpora and bilingual dictionaries for cross-language text categorization", 2006, ACL, pp. 553-560.*

Diaz et al, "Pseudo-aligned multilingual corpora", 2007, The International Joint Conference on Artificial Intelligence (IJCAI), pp. 2727-2732.*

Vinokourov, "The Organisation and Retrieval of document Collections: A Machine Learning Approach", Oct. 2003, Dissertation, School of Information and Communication Technologies, University of Paisley, Paisley, Scotland, pp. i-189.*

Littman, M. et al.; "Automatic Cross-Language Information Retrieval Using Latent Semantic Indexing"; Oct. 7, 1996.

Ballesteros, Lisa, et al., "Dictionary Methods for Cross-Lingual Information Retrieval," https://eprints.kfupm.edu.sa/34942/1/34942.pdf, Computer Science Department, University of Massachusetts, 1996.

Lee, Hyunjung, et al., "Efficient Domain Action Classification Using Neural," http://www.springerlink.com/content/64421841p8455402/, copyright 2006 by Springer-Verlag Berlin Heidelberg, 2006.

Adafre, Sisay Fissaha, et al., "Finding Similar Sentences Across Multiple Languages in Wikipedia," 0 ISLA, University of Amsterdam, http://www.sics.se/jussi/newtext/working_notes/10_adafre_derijke.pdf, 2006.

Cohn, David, "Informed Projections," Carnegie Mellon University, http://www.cs.cmu.edu/~cohn/papers/nips02.pdf, 2002.

Ayan, Necip Fazil, et al., "NeurAlign: Combining Word Alignments Using Neural Networks," Proceedings of Human Language Technology Conference and Conference on Empirical Methods in Natural Language Processing (HLT/EMNLP), pp. 65-72, Vancouver, Oct. 2005, copyright 2005 by Association for Computational Linguistics, http://ac.ldc.upenn.edu/H/H05/H05-1009.pdf.

Wang, Xiuhong, et al., "Challenges in Chinese Text Similarity Research," 2008 International Symposiums on Information Processing, IEEE Computer Society, pp. 297-302, copyright 2008 IEEE, http://ieeexplore.ieee.org/stamp/stamp.jsp?tb=&arnumber=4554102&isnumber=4554037.

Sagiroglu, Seref, et al., "Web based Machine Learning for Language Identification and Translatino," Sixth International Conference on Machine Learning and Applications, IEEE Computer Society, copyright 2007 IEEE, http://ieeexplore.ieee.org/xpl/freeabs_all.jsp?arnumber=4457244, 2007.

Littmann, et al., "Automatic Cross-Language Information Retrieval Using Latent Semantic Indexing", Retrieved at <<http://citeseerx.ist.psu.edu/viewdoc/download?doi=10.1.1.47.5091&rep=rep1&type=pdf>>, Oct. 7, 1996, 11 pages.

Foote, Jonathan, "Content-Based Retrieval of Music and Audio", in Multimedia Storage and Archiving Systems II, Proceedings of SPIE, 1997, pp. 138-147.

Lu, et al., "A Robust Audio Classification and Segmentation Method", Technical Report, Microsoft Research, 2001, 9 pages.

Malvar, H.S., "A Modulated Complex Lapped Transform and Its Applications to Audio Processing", in Proceedings of IEEE International Conference on Acoustics, Speech, and Signal Processing, Mar. 1999, Phoenix, AZ, 9 pages.

Zhang, et al., "Hierarchical Classification of Audio Data for Archiving and Retrieving", in IEEE International Conference on Acoustics, Speech, and Signal Processing, 1999, vol. 6, pp. 3001-3004.

Malayath, et al., "Towards Decomposing the Sources of Variability in Speech", Proceedings of Eurospeech '97, 1997, Rhodes, Greece, 4 pages.

Hermansky, et al., "Speaker Verification Using Speaker-Specific Mapping", Speaker Recognition and its Commercial and Forensic Applications, Apr. 1998, France, 5 pages.

* cited by examiner

Using OPCA

|  | Term 1 | Term 2 | Term 3 | Term 4 | ... | Term n |
|---|---|---|---|---|---|---|
| Article A | 1 |  |  | 1 |  |  |
| Article B |  | 1 | 1 |  |  | 1 |
| Article C |  |  | 1 | 1 |  |  |
| ... |  |  |  |  |  |  |
| Article x | 1 |  |  |  |  | 1 |

FIGURE 7

TRANS-LINGUAL REPRESENTATION OF TEXT DOCUMENTS

BACKGROUND

This Background is intended to provide the basic context of this patent application and it is not intended to describe a specific problem to be solved.

Creating easier tools and ways to use trans-lingual representations of text documents on a computing system makes logical sense. Trans-lingual text representations may be useful for a variety of purposes such as learning things like language-invariant email labels or categorizers. Manipulating trans-lingual text representations to obtain useful results has been computationally expensive and difficult to comprehend.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed is a method to use a corpora of similar documents in separate languages to create a representation of documents that can be used across multiple languages. The method may accept first language data where the first language data may include a plurality of documents in a first language and the method may accept second language data, where the second language data may include a plurality of documents in a second language. Each document in a second language may be comparable to a corresponding document in the first language. A first document-term matrix may be created from the first language data. The matrix may have a plurality of rows and each of the rows may correspond to one of a plurality of documents in a first language. A second document-term matrix may be created from the second language data. The matrix will have a plurality of rows where each of the rows corresponds to one of a plurality of documents in a second language.

An algorithm may be applied to the first matrix and the second matrix to produce a translingual text representation. The algorithm may produce a translingual text representation by multiplying the first matrix by a third matrix, and the second matrix by a fourth matrix. The translingual text representation may include a plurality of vectors, where each vector corresponding to either one row in the first document-term matrix or one row in the second document-term matrix. The algorithm may attempt to manipulate the third and fourth matrices to minimize the distance between pairs of translingual text representation vectors, each of which correspond to a document in a first language and a document in a second language that is comparable to the document in the first language. The algorithm may attempt to manipulate the third and fourth matrices to maximize the distance between pairs of translingual text representation vectors which do not correspond to a document in a first language and a document in a second language that is comparable to the document in the first language.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
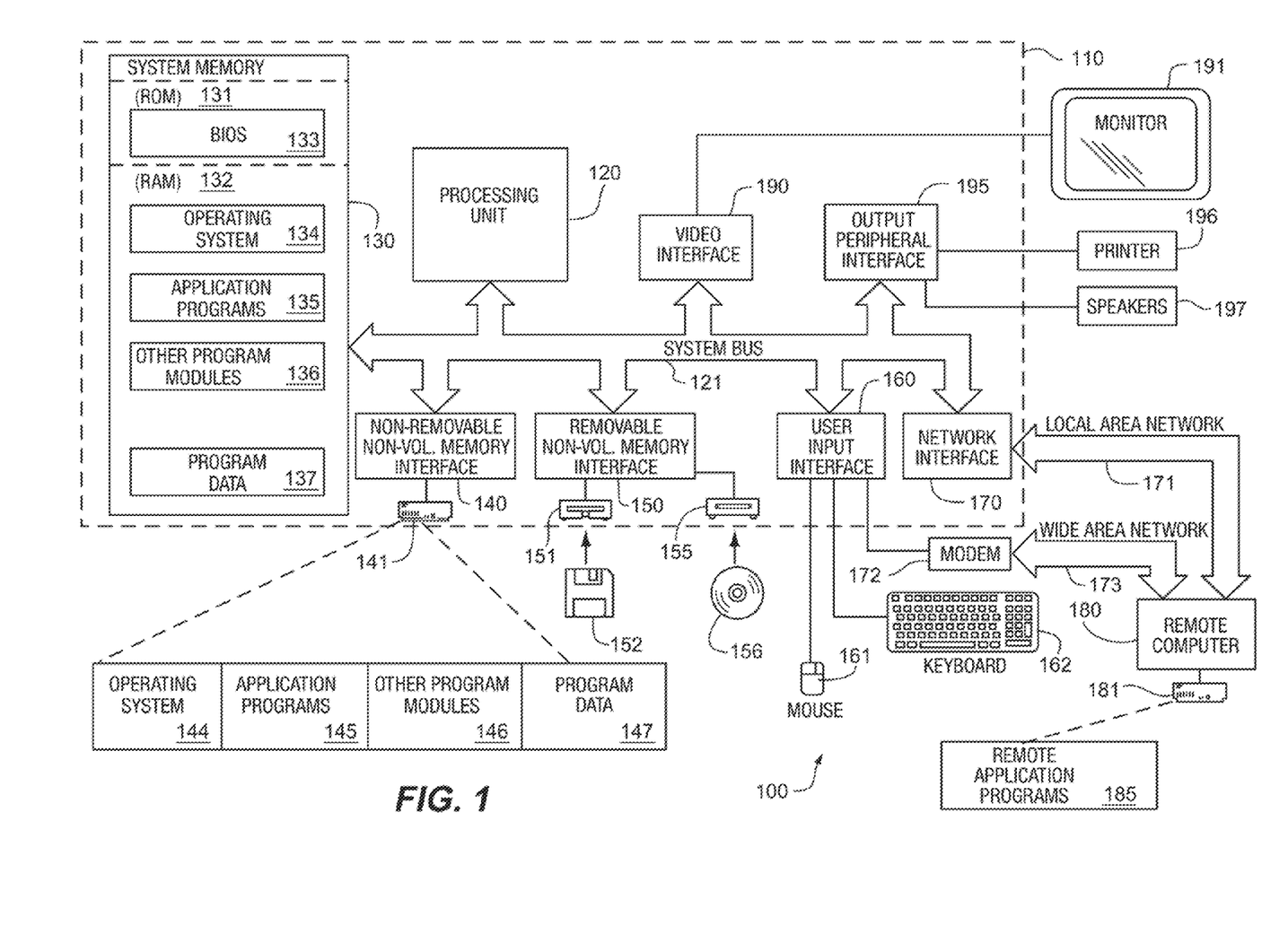
FIG. 1 is an illustration of a computing device.

FIG. 1 illustrates an example of a suitable computing system environment 100 that may operate to execute the many embodiments of a method and system described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
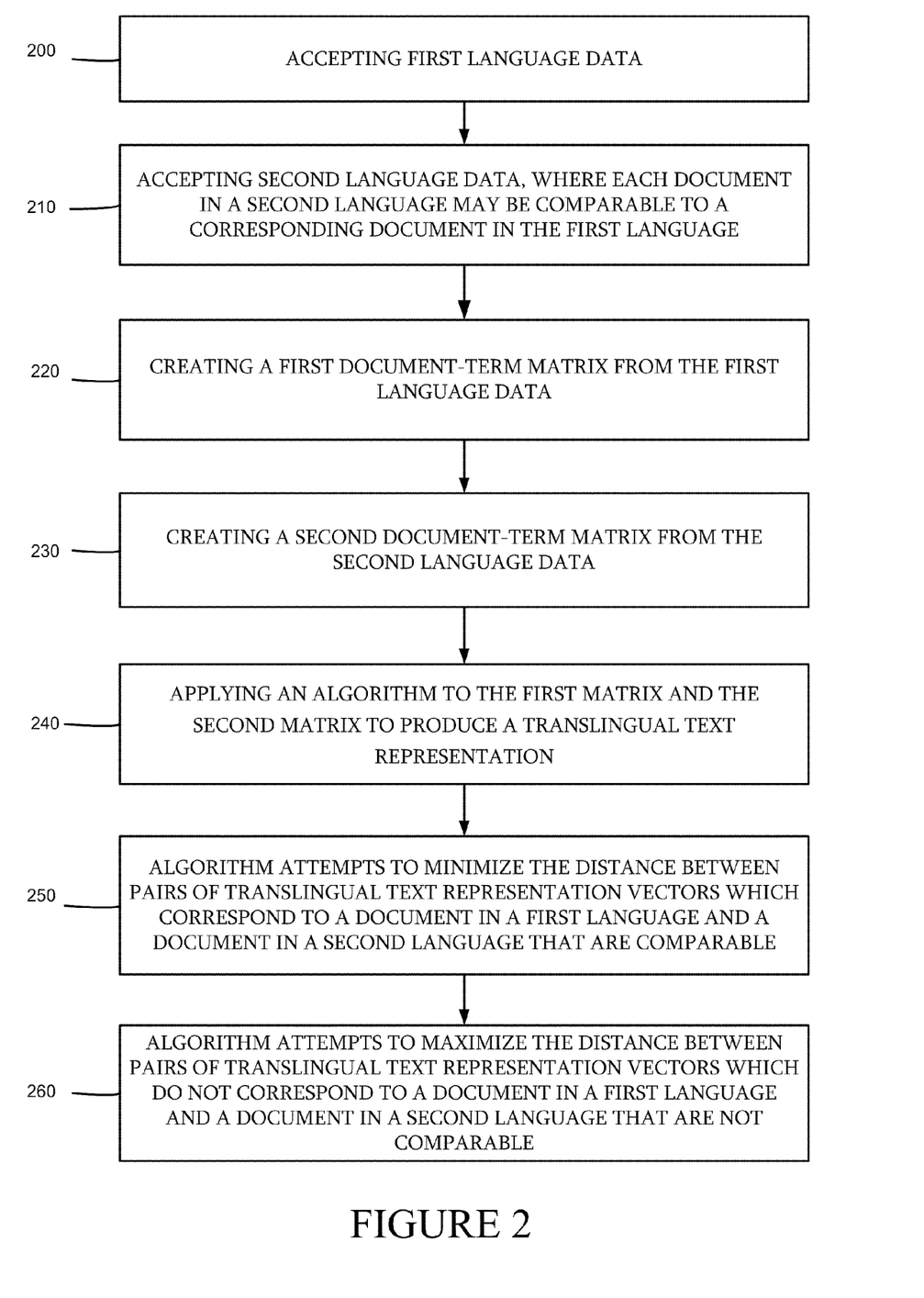
FIG. 2 is an illustration of a method of creating a translingual text representation.

FIG. 2 illustrates a method of creating a trans-lingual text representation. A translingual representation may assist in the rapid creation of text categorization systems in multiple languages. Almost all text categorization systems (regardless of whether they use translingual text representation (TTR) or not) first convert a document into a bag-of-words vector, where each element of the vector corresponds to a word in a vocabulary.

There are multiple applications that require text categorization. Text categorization takes a representation of a document and maps it to one or more categories that the document belongs to. For example, email can be categorized into spam/not spam. News articles can be categorized into topics. One way to build a text categorization system is to train a learnable system with real data. That is, an engineer creates a training set of documents with corresponding known labels, feeds it to a classification training algorithm, which produces a classifier that generalizes to other documents (similar to the training set). One impediment to using trained classifiers is that they only work on a single language of training set: translating the classifier requires rebuilding a new training set in a new language, which is either inaccurate (if automatic translation is used), or expensive (if a whole new training set in a new language is built).

It would be useful to create a classifier from a training set in one language, and use it to create classifiers in many other languages, with no extra training data. This can be done by mapping documents in any language into the same translingual text representation (TTR). This TTR could be a vector of values that remains relatively invariant when a document is translated from one language to another. The described method attempts to construct a TTR by starting with a corpus of documents on the same topic across two or more languages. Then the method attempts to find or create a mapping of these documents into a TTR by finding a matrix (that defines a mapping from a bag of words vector into a new vector representation) for each language that minimizes the distance between comparable documents while simultaneously maximizing the spread of the corpus in the TTR.

At block 200, first language data may be accepted. The first data may include a plurality of documents in a first language. For example, the first language data may be web pages or articles in the first language. At block 210, second language data may be accepted. The second language data may include a plurality of documents in a second language. The combination of the first language data and the second language data may be considered a "comparable" corpus. A comparable corpus may have documents in different languages that are comparable (i.e., about the same topic). For example, Wikipedia articles may be used as a training corpus as many Wikipedia articles have interwiki links, which show an article on the same topic in a different language. Interwiki links may be used to find comparable articles and create a comparable corpus. Each document in the second language may be comparable to a corresponding document in the first language. For example, the second language data may be the same web page or article found in the first language but may be in the second language.

Figure 7:
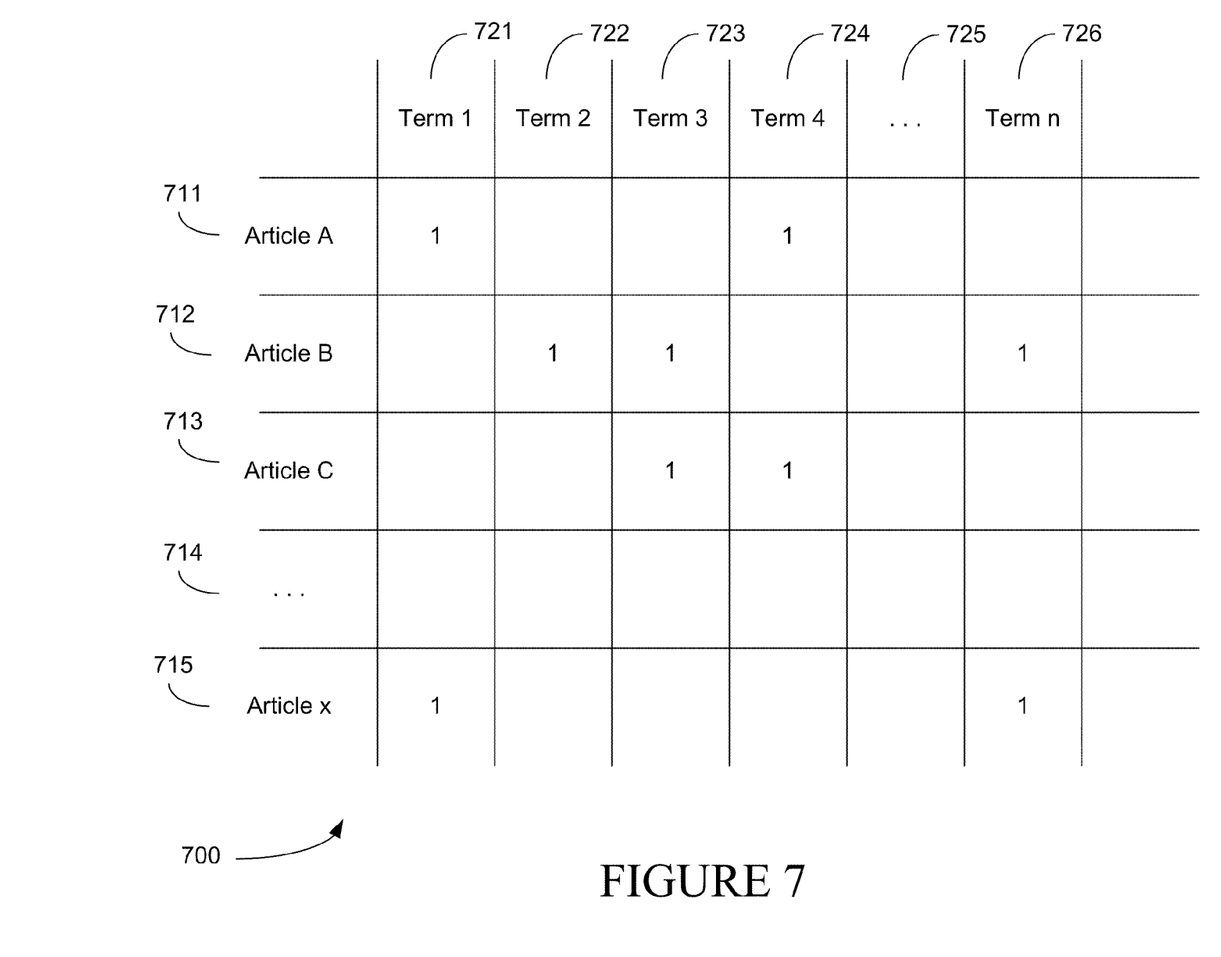
FIG. 7 is an illustration of sample document term matrix.

At block 220, a first document-term matrix may be created from the first language data. FIG. 7 may be a sample matrix 700. The first document-term matrix may include a plurality of rows 710 and each of the rows 710 may correspond to one of a plurality of documents in a first language 711, 712. For example, the first row 711 may be an article about the Rolling Stones in English and the second row 712 may be about the Seattle Mariners in English. The columns 720 may represent words common in the language in question. For example, term 1 721 may represent "orange" and term 2 722 may represent "blue." Article A 711 may have the word orange but not the word blue where article B 712 may have the word blue but not the word orange.

At block 230, a second document-term matrix may be created from the second language data. The second document-term matrix may include a plurality of rows and each of the rows may correspond to one of a plurality of documents in a second language. Similar to the previous example in FIG. 7, the first row 711 may be an article about the Rolling Stones in Mandarin and the second article 712 may be about the Seattle in Mandarin. Of course, the order and topic may be different as these are just examples, not limitations. For example, the article on the Rolling Stones may be in the 572th row in the second document term matrix (Mandarin) and may be in the first row in the first document term matrix (English). There also may be a table that indicates which document in English is comparable to a document in Mandarin. The entries in the first document-term matrix 700 or second document-term matrix may simply be binary indications if a term is present. In another embodiment, the entries may indicate how many times the first language term is in the first language data or how many times the second language term is in the second language data. Of course, other manners and ways of indicating the presence of first or second language terms are possible and are contemplated.

At block 240, an algorithm may be applied to the first document-term matrix and the second document-term matrix to produce a translingual text representation. The translingual text representation may include a plurality of vectors where each vector corresponds to either one row in the first document-term matrix or one row in the second document-term matrix. As mentioned previously, each row may represent an article in a specific language.

The algorithm to create a translingual text representation contains at least one stored matrix per language. The algorithm can produce a translingual representation of a collection of documents by multiplying the corresponding document-term matrix by its corresponding stored matrix. Equivalently, one row of the document-term matrix (a bag of words of one document in a language) can be multiplied by the corresponding stored matrix for that language to produce a translingual text representation for that language.

At block 250, the algorithm may attempt to minimize the distance between pairs of translingual text representation vectors which correspond to a document in a first language and a document in a second language where the document in the first language is comparable to the document in the second language. The algorithm does so by altering its stored matrices. In the previous example, a distance between the vectors representing an article about the Rolling Stones in English to the vector representing an article about the Rolling Stones in Mandarin may be minimized as the article may be same article but in different languages.

In addition, at block 260, the distance between pairs of translingual text representation vectors which do not correspond to a document in a first language and a document in a second language that is comparable to the document in the first language may be maximized. This distance may be maximized by altering the stored matrices in both languages. As an example, the distance for an article about the Seattle Mariners may be maximized from an article about the Rolling Stones as the two articles presumably have little to do with each other.

The algorithm used to minimize the distance between like vectors and maximizes the distance between unalike vectors may be one of many appropriate and logically relevant algorithms. In one embodiment, the algorithm may be an oriented principal component analysis algorithm (OPCA). Oriented principal component analysis algorithms are known, such as the oriented principal component analysis described in ("Oriented Principal Component Analysis for Large Margin Classifiers", S. Bermejo, J. Cabestany; Neural Networks; Volume 14, Issue 10; December, 2001; pp. 1447-61) which is hereby incorporated by reference. As input, OPCA requires a signal model and a noise model. For creating a translingual text representation, the signal model is a matrix of how words co-occur in each language. The signal model may be derived from a set of Wikipedia articles from multiple languages. The noise model may be the substitution of words in one language with words in another—this corresponds to the correlation between words in two different languages. Using these two models and the oriented principal components analysis algorithm yields two stored matrices that provide a TTR which may be is relatively invariant to language translation, while being different when presented with documents with different topics.

Figure 4:
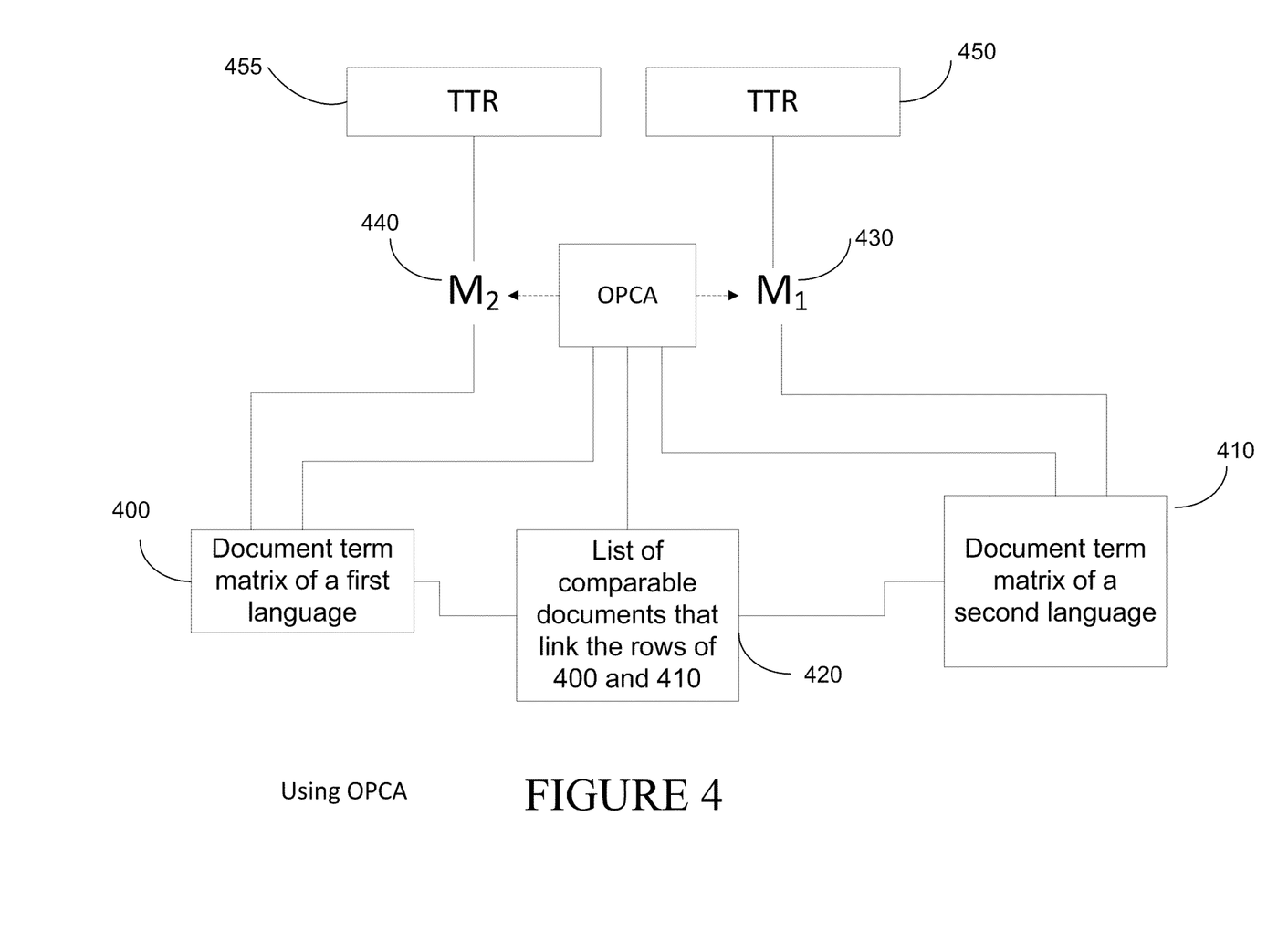
FIG. 4 is an illustration of an oriented principal component analysis for large margin classifiers algorithm.

FIG. 4 illustrates OPCA at a high level. OPCA accepts a document-term matrix of a first language 400, and a document-term matrix of a second language 410. It also accepts a list of comparable documents 420 that links rows of the matrix 400 and the matrix 410. OPCA then creates stored matrices $M_1$ 430 and $M_2$ 440. OPCA multiplies document-term matrix 410 by stored matrix $M_1$ 430 to produce a translingual text representation (TTR) matrix 450. OPCA also multiplies document-term matrix 420 by stored matrix $M_2$ 440 to produce TTR matrix 460. OPCA selects matrix $M_1$ 430 and matrix $M_2$ 440 to maximize the ratio of the sum of the distances between comparable rows in TTR matrix 450 and TTR matrix 455 to the sum of the distances between all rows of all TTR matrices. After training, a TTR vector for a new document can be computed by multiplying a bag-of-words vector for a document in a language by the corresponding stored matrix to produce a TTR vector that captures the meaning of the document while ignoring the language used to express the meaning.

If the oriented principal component analysis algorithm is used, it may be computationally expensive depending on the dimensions of the various matrices. Applying OPCA requires a solving a generalized eigensystem of dimension of the number of words in vocabularies across all languages. This may be impractical if done naively. Instead, OPCA may be performed in multiple stages, where first only (e.g.) 1/20 of the vocabulary may be used to create twenty limited TTRs, and then all twenty of these limited TTRs may be combined as input to a final OPCA step, creating a final TTR.

Figure 3:
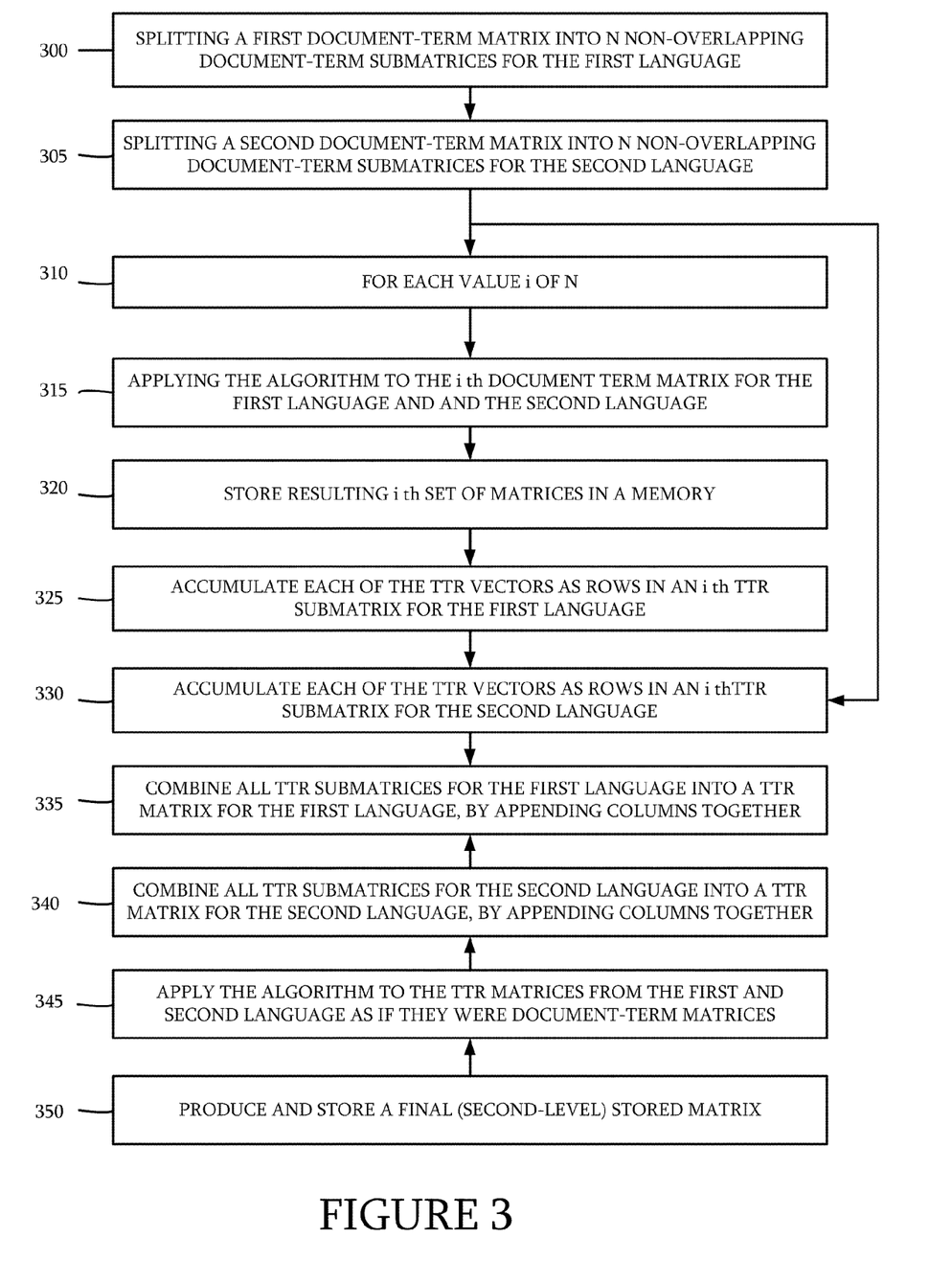
FIG. 3 is an illustration of a method of reducing the computational expense in a oriented principal component analysis for large margin classifiers algorithm.

One possible method of reducing the computational expense in an oriented principal component analysis for algorithm is illustrated in FIG. 3. At block 300, the algorithm splits a first document-term matrix into N non-overlapping document-term submatrices for the first language (by splitting the first document-term matrix by grouping columns). N may be any whole number. In some embodiments, N may be selected to create a number of non-overlapping matrices where each non-overlapping matrix has a dimension less than a maximum dimension, such as 20. In another embodiment, a target dimension is used and N is selected to create matrices are close in dimension as possible to the target. Of course, other manners and methods of selecting n are possible and are contemplated. Each submatrix corresponds to a subset of the vocabulary in the first language.

In block 305, the algorithm splits a second document-term matrix into N non-overlapping document-term submatrices for the second language, analogous to block 300. At block 310, the method may, for each value of i of N, proceed through a variety of blocks, such as blocks 315-330. At block 315, the algorithm is applied to the ith document-term matrix for the first language and the ith document-term matrix for the second language. At block 320, the result of block 315 is an ith set of stored matrices that are stored within an ith instance of an algorithm.

Block 325 then applies the ith set of stored matrices to the ith submatrix of the first language create TTRs in the first language. Block 325 then accumulates each of the TTR vectors as rows in an ith TTR submatrix for the first language. Block 330 is analogous to block 325, except that it applies the ith set of stored matrices to the ith submatrix of the second language, to produce an ith TTR submatrix for the second language. Control flows back to block 310 until all values of i of N have been reviewed by the algorithm.

Figure 5:
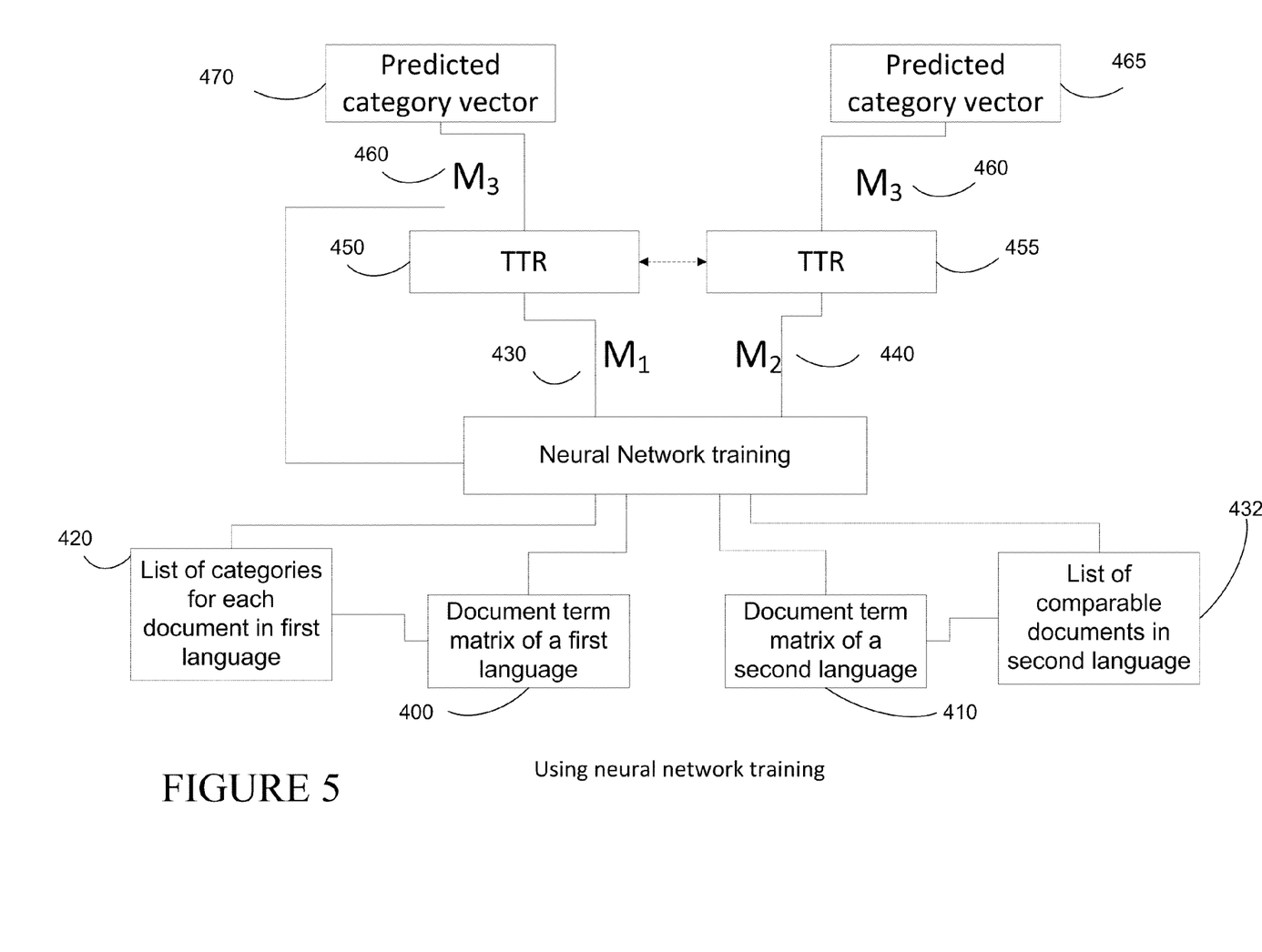
FIG. 5 is an illustration of a neural network algorithm used to adjust a stored matrix.

Block 335 combines all TTR submatrices for the first language into a TTR matrix for the first language, by appending columns together. Analogously, block 340 combines all TTR submatrices for the second language into a TTR matrix for the second language. Finally, block 345 applies the algorithm to the TTR matrices from the first and second language as if they were document-term matrices. Block 350 thus produces and stores a final (second-level) stored matrix. At no point in FIG. 3 is the algorithm applied to a matrix whose dimension is the size of the entire vocabulary. As a result, the necessary computation will be reduced, saving processor time and memory usage. Note also that the concept in FIG. 3 is not limited to application to two languages only: the method in FIG. 3 may be easily extended to more than two languages. Further, note that FIG. 3 is applicable to any algorithm that generates TTRs, beyond OPCA In another embodiment, the algorithm may be a neural network training algorithm. FIG. 5 illustrates using neural network training at a high level. A first document-term matrix 400 and a second document-term matrix 410 are provided to the neural network training, along with a list of categories 420 for each document in the first language, and a list of comparable documents 432. Neural network algorithms typically operate row-wise: a single row of the first document-term matrix 400 is multiplied by a first stored matrix $M_1$ 430, to produce a TTR vector 450. A nonlinearity (such as the hyperbolic tangent) may be applied to each element of the TTR vector. The TTR vector is then multiplied with another stored matrix $M_3$ 460 and a component-wise nonlinearity is applied to produce a predicted category vector 470. When a single row of the second document-term matrix 410 is applied to the neural network, it is multiplied by a second stored matrix $M_2$ 440 to produce a TTR vector 455, after a component-wise nonlinearity is applied. TTR vector 455 is then treated analogously to TTR vector 450: it is multiplied by matrix $M_3$ 460 and subjected to a component-wise nonlinearity to produce predicted category vector 465.

During neural network training, rows from the first document-term matrix are applied to the neural network alternating with rows from the second document-term matrix. When rows from the second document-term matrix are applied, matrices $M_2$ 440 and $M_3$ 460 are adjusted to bring the predicted category vector 465 closer to the true category vector for the corresponding document. When rows from the first document-term matrix are applied, matrices $M_1$ 430 and $M_3$ 460 are adjusted to bring the predicted category vector 470 closer to the true category vector for the document in the first language that is comparable to the document in the second language corresponding to the applied row. In one embodiment, the true category vector for the document may be a Wikipedia category associated with the English version of the document.

Note that the neural network training implicitly encourages TTR vectors of documents in the first language 440 to be close in terms of mean squared error to the TTR vector of documents in the second language 445, because a single matrix $M_3$ is used to make predictions with both types of TTR vectors. Alternatively, the neural network training may be altered to explicitly encourage that the TTR vector 450 for documents in the first language be close in terms of mean squared error to the TTR vector 455 for comparable documents in the second language. Further note that the neural network training can also be extended to handle document-term matrices in more than two languages.

In another embodiment, the algorithm may be a Siamese network training algorithm. A sample Siamese network training is described at ("Signature Verification Using a 'Siamese' Time Delay Neural Network"; J. Bromley, I. Guyon et al.; AT&T Bell Laboratories, 1994) which is hereby incorporated by reference.

Figure 6:
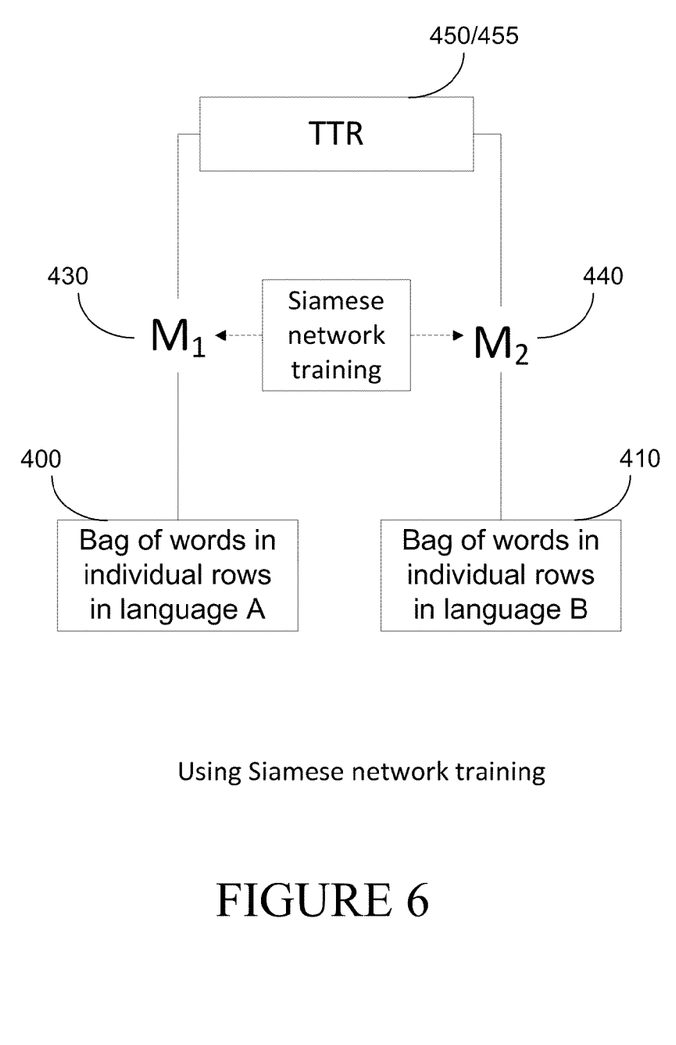
FIG. 6 is an illustration of a Saimese neural network algorithm used to adjust a stored matrix.

FIG. 6 illustrates using a Siamese network at a high level. The Siamese neural network may be used to train a TTR 440 directly that has the desired properties. The Siamese neural network comprises a plurality of neural network architectures, one per language (e.g., 430 and 440, which are neural network architectures that typically contain one hidden layer and can use linear output units). As in the standard neural network training, training proceeds row-wise. In the case of Siamese neural networks, pairs of rows from document-term matrices in different languages can be applied as inputs (400/410). Each input row is applied to the neural network architecture from the corresponding language. The output vector (450/455) from each neural network architecture is treated as a TTR vector. During Siamese network training, if the rows correspond to comparable documents, then the parameters of each of the neural network architectures are adjusted to minimize the distance between corresponding TTR vectors. If the rows do not correspond to comparable documents, then the parameters of each of the neural network architectures are adjusted to maximize the distance between the corresponding TTR vectors.

In conclusion, the described embodiments of the method may result representations of documents that capture the meaning of input documents, while being relatively immune to being re-expressed in different languages. In addition, the TTR may be created in a manner that is computationally efficient and produces useful results. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The invention claimed is:

1. A method comprising:
accepting first language data, wherein the first language data comprises first documents in a first language and the first documents are associated with multiple topics;
accepting second language data, wherein the second language data comprises second documents in a second language that is different than the first language, wherein the second documents in the second language are also associated with at least some of the multiple topics and the first language data and second language data collectively comprise pairs of documents that are on the same topic;
obtaining a first document-term matrix from the first language data, wherein the first document-term matrix comprises a plurality of first rows and different first rows of the first document-term matrix correspond to different first documents in the first language;
obtaining a second document-term matrix from the second language data, wherein the second document-term matrix comprises a plurality of second rows and different second rows of the second document-term matrix correspond to different second documents in the second language; and
applying an algorithm to the first document-term matrix to produce a first stored matrix for the first language and to the second document-term matrix to produce a second stored matrix for the second language,
wherein:
multiplying the first stored matrix by the first document-term matrix produces a plurality of first translingual text representation vectors,
multiplying the second stored matrix by the second document-term matrix produces a plurality of second translingual text representation vectors, and
applying the algorithm comprises adjusting the first stored matrix and the second stored matrix to thereby reduce distances between individual first translingual text representation vectors and individual second translingual text representation vectors for the pairs of documents that are on the same topic,
wherein at least the applying the algorithm is performed by a computer.

2. The method of claim 1, wherein the algorithm is an oriented principal component analysis algorithm.

3. The method of claim 2, further comprising:
splitting the first document-term matrix into N non-overlapping first document-term submatrices for the first language;
splitting the second document-term matrix into N non-overlapping second document-term submatrices for the second language;
for each value i of N;
applying the algorithm to the ith first document-term submatrix for the first language and the ith second document-term submatrix for the second language to create an ith set of stored matrices;
storing the ith set of stored matrices that in an ith instance of the algorithm;
applying the ith set of stored matrices to the ith first document-term submatrix of the first language to create ith first translingual text representation (TTR) vectors in the first language;
accumulating each of the ith first TTR vectors as rows in an ith first TTR submatrix for the first language; and
applying the ith set of stored matrices to the ith second document-term submatrix of the second language, to produce an ith second TTR submatrix for the second language; and
by appending columns together:
combining the first TTR submatrices for the first language into a first TTR matrix for the first language, and
combining the second TTR submatrices for the second language into a second TTR matrix for the second language.

4. The method of claim 1, wherein the algorithm comprises a network training algorithm.

5. The method of claim 1, wherein first entries in the first document-term matrix identify a number of times that first language terms appear in the first language data and wherein second entries in the second document-term matrix identify a number of times that second language terms appear in the second language data.

6. The method of claim 1, wherein applying the algorithm further comprises adjusting the first stored matrix and the second stored matrix such that other distances are increased between other first translingual text representation vectors and other second translingual text representation vectors for other pairs of documents that are not on the same topic.

7. The method of claim 6, wherein applying the algorithm minimizes the distances and maximizes the other distances.

8. The method of claim 1, wherein first entries in the first document-term matrix are binary indicators of whether first language terms appear in the first language data and wherein second entries in the second document-term matrix are other binary indicators of whether second language terms appear in the second language data.

9. A computer memory device or storage device comprising computer executable instructions which, when executed by a processing unit of a computing device, cause the processing unit to perform acts comprising:
accepting first language data, wherein the first language data comprises first documents in a first language and the first documents are associated with multiple topics;
accepting second language data, wherein the second language data comprises second documents in a second language that is different than the first language, wherein the second documents in the second language are also associated with at least some of the multiple topics and the first language data and second language data collectively comprise pairs of documents that are on the same topic;
obtaining a first document-term representation from the first language data, wherein the first document-term representation comprises a plurality of first components corresponding to different first documents in the first language;
obtaining a second document-term representation from the second language data, wherein the second document-term representation comprises a plurality of second components corresponding to different second documents in the second language; and
applying an algorithm to the first document-term representation and the second document-term representation to produce first translingual text representations and second translingual text representations, wherein the algorithm comprises:
multiplying a first stored matrix by the first document-term representation to produce the first translingual text representations;
multiplying a second stored matrix by the second document-term representation to produce the second translingual text representations; and
reducing distances between individual first translingual text representations and individual second translingual text representations for the pairs of documents that are on the same topic by altering the first stored matrix and the second stored matrix.

10. The computer memory device or storage device of claim 9, wherein the algorithm is an oriented principal component analysis algorithm.

11. The computer memory device or storage device of claim 9, wherein the algorithm comprises a network training algorithm.

12. The computer memory device or storage device of claim 9, wherein first entries in the first components of the first document-term representation identify a number of times that first language terms appear in the first language data and wherein second entries in the second components of the second document-term representation identify a number of times that second language terms appear in the second language data.

13. The computer memory device or storage device of claim 9, wherein applying the algorithm further comprises increasing other distances between other first translingual text representations and other second translingual text representations for other pairs of documents that are not on the same topic by altering the first stored matrix and the second stored matrix.

14. The computer memory device or storage device of claim 13, wherein applying the algorithm minimizes the distances and maximizes the other distances.

15. The computer memory device or storage device of claim 9, wherein the first representation comprises a first document-term matrix and the second representation comprises a second document-term matrix.

16. A computer system comprising:
a memory comprising computer executable instructions; and
a processing unit configured to execute the computer executable instructions, wherein the computer executable instructions configure the processing unit to:
accept first language data, wherein the first language data comprises first documents in a first language and the first documents are associated with multiple topics;

accept second language data, wherein the second language data comprises second documents in a second language that is different than the first language, wherein the second documents in the second language are also associated with at least some of the multiple topics and the first language data and second language data collectively comprise pairs of documents that are on the same topic;

obtain a plurality of first rows from the first language data, wherein different first rows correspond to different first documents in the first language;

obtain a plurality of second rows from the second language data, wherein different second rows correspond to different second documents in the second language; and apply an algorithm to the plurality of first rows and the plurality of second rows to produce first translingual text representations and second translingual text representations, wherein the algorithm comprises:

training a first neural network on the plurality of first rows and outputting, from the first neural network, the first translingual text representations, training a second neural network on the plurality of second rows and outputting, from the second neural network, the second translingual text representations, and adjusting parameters of the first neural network and the second neural network such that distances are reduced between individual first translingual text representations and individual second translingual text representations for the pairs of documents that are on the same topic.

17. The computer system of claim 16, wherein the plurality of first rows are part of a first document-term matrix and the plurality of second rows are part of a second document-term matrix.

18. The computer system of claim 16, wherein the algorithm comprises a Siamese network training algorithm.

19. The computer system of claim 16, wherein first entries in the plurality of first rows identify a number of times that first language terms appear in the first language data and wherein second entries in the plurality of second rows identify a number of times that second language terms appear in the second language data.

20. The computer system of claim 16, wherein applying the algorithm further comprises adjusting the parameters to increase other distances between other first translingual text representations and other second translingual text representations for other pairs of documents that are not on the same topic.

21. The computer system of claim 20, wherein the algorithm is configured to minimize the distances and maximize the other distances.

* * * * *